United States Patent

[11] 3,596,966

| [72] | Inventor | Fred H. Shredl |
| | | 7270 Mayberry Drive, Parma, Ohio 44130 |
| [21] | Appl. No. | 800,574 |
| [22] | Filed | Feb. 19, 1969 |
| [45] | Patented | Aug. 3, 1971 |

[54] WEEDER
5 Claims, 2 Drawing Figs.

[52] U.S. Cl. .................................................... 294/61, 294/50
[51] Int. Cl. ...................................................... A01k 81/04
[50] Field of Search ........................................... 294/61, 50, 52, 5

[56] References Cited
UNITED STATES PATENTS
1,092,818  4/1914  Bittner ........................ 294/50 UX
1,246,487  11/1917  Summers et al. ............. 294/61
2,593,283  4/1952  Erlebach ..................... 294/61 X FOREIGN PATENTS
2,316  3/1881  Great Britain ................ 294/61

OTHER REFERENCES
Advertisement for Quick-Pick trash picker received in the Patent Office 7/21/61.

*Primary Examiner*—Evon C. Blunk
*Assistant Examiner*—Douglas D. Watts
*Attorney*—Harlan E. Hummer ABSTRACT: A device for pulling weeds. The device has a handle with a plurality of prongs projecting from one end of the handle. The prongs engage the weed and break up the ground surrounding the weed as the handle is rotated. The weed becomes entangled in the rotating prongs which are withdrawn from the ground to extract the weed.

PATENTED AUG 3 1971

3,596,966

INVENTOR
FRED H. SHREDL
BY Jerome F. Kramer
ATTORNEYS

WEEDER

BACKGROUND OF INVENTION

As indicated above, the invention is a device for removing weeds of the common garden variety such as dandelions. Many weeding devices presently on the market, employ hollow tubes similar to those shown in U.S. Pat. Nos. 2,439,524 and 3,210,112, for removing a core or plug of soil containing the weed. The excess dirt must be shaken from the weed and used to refill the hole. This procedure is extremely burdensome in cases where a lawn or garden is saturated with weeds. This invention is directed to solving this problem by providing a device which removes only the weed. Because of the vigorous twisting action of the prongs in breaking up the ground surrounding the weed, it is highly unlikely that any appreciable amount of soil will cling to the weed as it is removed.

Briefly stated, the invention is in a handle with a base at one end. A plurality of pins or prongs extend from the base in predetermined space relation. The prongs are equally spaced radially from a centrally disposed pin. They are further equally circumferentially spaced. Means are provided for removing weeds entangled in the pins after the weed is removed from the ground. The invention will be better understood by referring to the annexed drawing, wherein.

DESCRIPTION OF THE INVENTION

Figures 1, 2:
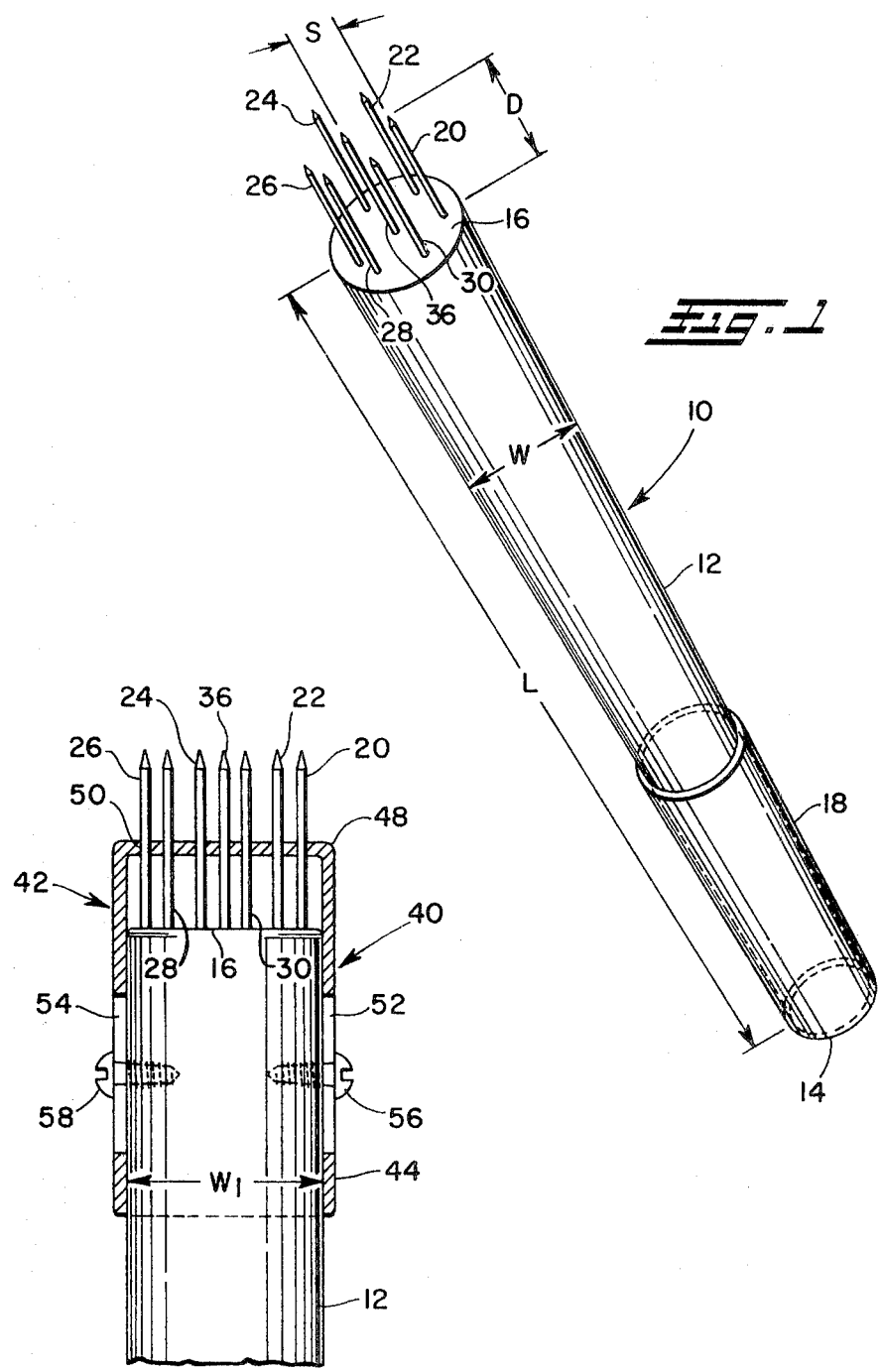
FIG. 1 is a perspective view of the weeder.
FIG. 2 is an enlarged detail view of the prongs attached to the handle of the weeder, showing a cross section the means for removing weeds entangled in the prongs.

Referring to the drawing, there is shown a weeder, generally indicated at 10. The weeder comprises an elongated handle 12 with opposing ends or bases 14 and 16. The handle 12 is, preferably, cylindrical and can be composed of any suitable material, e.g., wood, metal or plastic. The length L of the handle 12 is between 36—40 inches such that a person can remove weeds while in a standing position.

A rubber grip, or cap 18 can be placed on the handle end 14 to provide a better grip for rotating, or operating the weeder 10.

A plurality of pins or prongs 20—30 are disposed on the base 16 in predetermined spaced relation. The prongs 20—30 extend beyond the handle 12 in angular relation to the base 16. The prongs 20—30 are equally spaced radially from a similar prong or pin 36 centrally disposed on the base 16. The prongs 20—36 are preferably parallel to the elongated handle 12. That is, the longitudinal axes of the prongs 20—36 are parallel to the longitudinal axis of the handle 12. For simplicity of manufacturer, the prongs 20—30 are equally circumferentially spaced on the base 16 about the center pin 36. The radial spacing S of the prongs 20—30 from the center pin 36, ranges from between about one-fourth to about one-half inch. Correspondingly, the diameter or width W of the handle 12 ranges from between about three-fourths to about 1½ inches. In the most preferred embodiment, the spacing S is three-eighths inch with a corresponding handle width W of one inch. The prongs 20—36, measured from the plane of the base 16, range in length D from about three-fourths to about 1½ inches. The prongs must be comparatively rigid to keep from being deformed as they rotate in the ground. The prongs 20—36 shown in the drawing, are pointed nails having a diameter of about one-eighth of an inch. They can be made of any suitable material, e.g., metal. In the preferred embodiment indicated above, the length D of the prongs 20—36 is 1½ inches.

The free ends of the prongs, e.g., end 38 of pin 20, are preferably pointed to permit easy entry into the ground surrounding the weed. The cross section of the prongs 20—36 can have any suitable configuration, e.g., square, circular, or rectangular. It should be readily appreciated that the weeder 10 can be operated with more or less than the number of prongs shown in the drawing. Also, the weeder 10 can function without the centrally disposed pin 36. However, the center pin 36 does act as a pivot or guide about which the other prongs 20—30 rotate when the handle 12 is twisted.

Any suitable means, generally indicated at 40, can be provided for removing a weed tangled in the prongs 20—36. The means 40 comprises a plunger 42 slideably mounted on the handle end 16. The plunger 42 comprises a hollow sleeve 44 with a cover or plate 46 at one end 48. The plate 46 is provided with a plurality of holes, e.g., hole 50, through which the prongs 20—36 can pass. The inner diameter W1 of the sleeve 44 is slightly larger than the outer diameter W of the handle 12 to permit movement of the sleeve 44 in an axial direction relative to the handle 12.

The plunger 42 can be made of any suitable material, e.g., metal, plastic, or rubber. A pair of opposing elongated slots 52 and 54 are provided in the sleeve 44 for receiving, respectively, dowels 56 and 58 secured to and extending from the handle 12. The dowels 56 and 58 restrict axial movement of the sleeve 44, such the plate 46 cannot pass beyond the tips or free ends of the prongs 20—36. The dowels 56 and 58 extending from the handle 12, can be removable screws with round heads. In this way, the sleeve 44 could be removed and the weeder 10 cleaned.

In operation, the prongs 20—36 are thrust into the ground surrounding a weed, such that the center prong 36 extends into the center or heart of the weed. The handle 12 is rotated or twisted in either direction. The prongs 20—30 will break up the ground or soil around the weed as they rotate. The leaves or foliage of the weed become entangled in the rotating prongs 20—30. The root of the weed will either be freed from the surrounding soil, or will snap or break off below the level of the ground by the vigorous twisting action of the prongs 20—30 against the weed. The prongs 20—36 and entangled weed, are then removed from the ground or soil. The weed is removed from the prongs 20—36 by moving the plunger 42, from its restive position adjacent the base 16, axially towards the pointed ends of the prongs, whereby the plate 46 engages the weed and pushes it free of the weeder 10.

It should be appreciated that certain improvements such as tapering or making the side edges of the prongs v-shaped, enhances the cultivating action of the prongs as they move through the soil or ground. It should also be appreciated that a more sophisticated means for removing entangled weeds from the prongs, similar to those shown in the aforementioned patents could also be used in place of the one described without distracting from the spirit of the invention.

I claim:

1. A weeder, comprising:
   a. a base;
   b. an elongated handle extending from the base, the longitudinal axis of the handle being normal to the plane of the base;
   c. a plurality of prongs extending from the base in opposed, parallel relation to the handle, the prongs being equally spaced radially from, and arcuately around the center point of the base;
   d. a hollow slidable sleeve disposed in surrounding, covering relation around the base and adjacent portion of the handle, the sleeve having an open end extending beyond the base in a direction towards the free ends of the prongs;
   e. a plate secured to the sleeve and sealing the open end of the sleeve, the plate having a plurality of holes for slidably receiving the prongs; and
   f. means for mounting the sleeve for limited reciprocating movement along the longitudinal axis of the handle, whereby the plate can be moved towards and away from the base to disengage weeds entangled on the prongs, said means including a dowel extending between the handle and sleeve and an elongated slot for receiving the dowel.

2. The weeder of claim 1 which includes a pin centrally disposed on the base and extending from the base through a hole in the plate in the same parallel direction as the prongs.

3. The weeder of claim 2 wherein the prongs and pin are from about three-fourths to about 1½ inches long measured from the base.

4. The weeder of claim 3, wherein the prongs and pin, except for pointed free ends, have a uniform cross section throughout their length.

5. The weeder of claim 3, wherein the prongs are radially spaced from the pin a distance of from about one-fourth to about one-half inch.